United States Patent [19]
Sturhan

[11] 3,787,025
[45] Jan. 22, 1974

[54] POWER DRIVEN ADJUSTABLE SEAT FOR AUTOMOTIVE VEHICLE

[75] Inventor: Klaus Sturhan, Lemgo, Germany

[73] Assignee: Gebr. Isringhausen, Lemgo/Lippe, Germany

[22] Filed: May 5, 1972

[21] Appl. No.: 250,570

[30] Foreign Application Priority Data
May 12, 1971 Germany.............................. 2123399

[52] U.S. Cl................................ 248/399, 248/421
[51] Int. Cl.............................................. B60n 1/02
[58] Field of Search... 248/399, 162, 157, 421, 378, 248/372, 424, 429; 297/307

[56] References Cited
UNITED STATES PATENTS

| | | | |
|---|---|---|---|
| 3,115,328 | 12/1963 | Brown................................ | 248/429 |
| 3,183,314 | 5/1965 | Pickles.............................. | 248/429 |
| 3,599,232 | 8/1971 | Tabor................................ | 248/399 |
| 3,608,855 | 9/1971 | Osenberg........................... | 248/421 |

FOREIGN PATENTS OR APPLICATIONS

| | | | |
|---|---|---|---|
| 1,803,705 | 8/1969 | Germany.......................... | 297/307 |

*Primary Examiner*—Marion Parsons, Jr.
*Attorney, Agent, or Firm*—Michael S. Striker

[57] ABSTRACT

A seat for use in automotive vehicles wherein the seat supporting portion is movable toward and away from a base in response to changes in the inclination of two pairs of links which are articulately connected with the base and the seat supporting portion. One or more helical springs may be attached to the base and to a spindle nut which is movable up and down along an adjusting screw, or the helical springs may be connected to either the links or to the seat supporting portion to thereby change the effective moment applied to the seat supporting portion with changes of the position of the spindle. A motor drive turns the adjusting screw to cause the spindle nut to move between two end positions. Switches reverse the current through the motor drive to change directions of rotation of the adjusting screw when the spindle nut has reached either end position along the latter. A cam follower forming part of a switch rides on a cam surface when the seat supporting portion moves relative to the base. The cam follower drops into a cut out in the cam surface when the seat supporting portion is spaced at a desired distance from the base. To thereby deactivate the motor drive. Shock absorbers can be mounted in the same manner as the helical springs.

14 Claims, 4 Drawing Figures

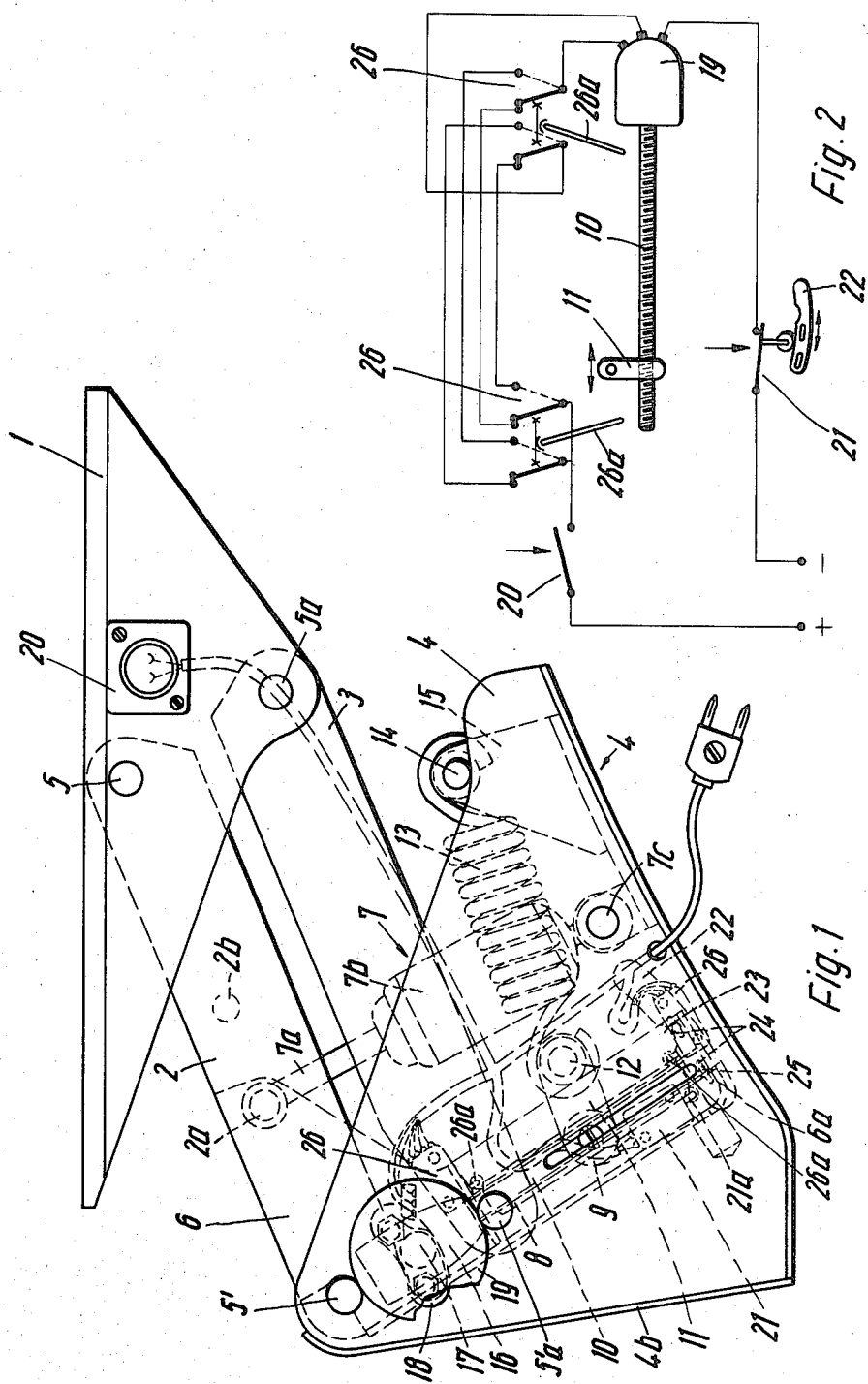

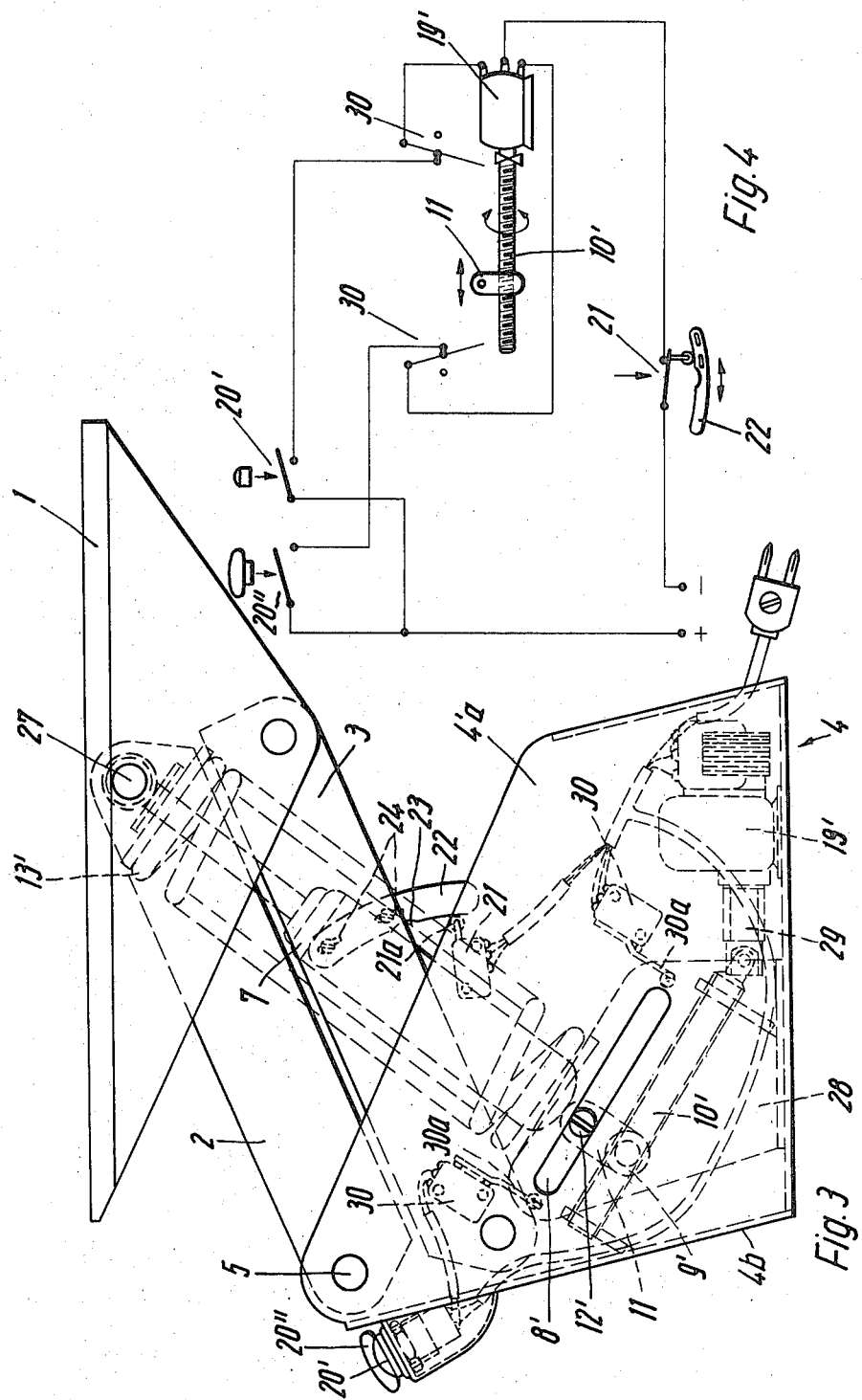

POWER DRIVEN ADJUSTABLE SEAT FOR AUTOMOTIVE VEHICLE

BACKGROUND OF THE INVENTION

The present invention relates to seats in general, and more particularly to improvements in seats whose position is adjustable by motor driven means to automatically adjust the stresses on the resilient suspension means which support the seats to bring the latter to a desired optimum position regardless of the downward forces which are applied to the seat.

Seats having resilient suspension systems are already known. According to one such known system, the seat is mounted on a pair of parallel links forming a parallelogram lever arrangement, the latter being supported on both sides of the seats and the resulting arrangement acts to maintain the horizontal position of the seats as the latter moves towards or away from a fixed base. Additionally, adjustments for compensating for different weights which are anticipated to be placed on the seats are also known in the various systems. The known weight adjustment mechanisms have generally the form of a manual positioning arrangement which is commonly in the form of a positioning screw spindle. By rotation of the spindle, the tension of springs in the suspension system is accordingly modified since at least a portion of the suspension means, e.g. a tension spring, is connected to and moves along the spindle with the rotation thereof. Likewise, a damper or shock absorber may form part of the suspension system. By changing the tension on the springs of the suspension system, the arrangements have, at least partially, been successful to generate moments about pivoting points on which the seat is pivotally mounted, which moments counteract the downward forces applied to the seat.

The disadvantage with the above known apparatus is that the weight adjustment must be made by hand by the occupant of the seat, this sometimes being a difficult and inconvenient adjustment. Further, the occupant of the seat must known his exact weight, if the weight adjustment is to be a precise one. Alternately, the occupant may touch an indicator during driving while he is occupying the seat. However, in practice, difficulties result with both of these approaches and the weight adjustment is still not exactly achieved and, therefore, the optimal possible comfort of the driver is likewise not obtained. A comfortable position is, however, important for the prevention of accidents, particularly in connection with long distance driving.

SUMMARY OF THE INVENTION

An object of the present invention is to provide a power driven adjustable seat for automotive vehicles which does not possess disadvantages as described above in connection with similar seats.

Another object of the present invention is to provide an adjustable seat which is simple in construction and economical to manufacture and which includes weight adjustments.

A further object of the invention is to provide an adjustable seat which makes it possible to change the seat by power driven means, the latter being controlled by the occupant of the seat.

A still further object of the present invention is to provide an adjustable seat which incorporates a power driven means with mounting means for maintaining the seat in substantially horizontal positions while the seat moves to and away from the base on which it is mounted.

A further object of the invention is to provide a seat of the type under discussion and which the user may conveniently and automatically adjust the height of the seat to an optimum height without knowledge of his weight and without having to feel or sense any indicating devices.

The improved seat comprises a base which can be mounted on the floor of an automotive vehicle, a seat member spaced from said base which is movable up and down, i.e., away from and towards the base. A support means is provided which is pivotly connected to said base and to said seat means and which supports the latter in a substantially horizontal position and movable toward and away from the base. Resilient means are provided which act between the base and at least one of said preceding means for storing energy in response to a downward force applied to said seat means and for applying a moment to said seat means which counteracts the downward force. Motor driven adjusting means are provided which are connected to said resilient means for adjusting the movement applied by said resilient means to said seat means to maintain the latter substantially at a predetermined distance from said base regardless of the magnitude of said downward directed force. Means for activating the adjusting means are provided, which also deactivate the adjusting means when said seat means is in said predetermined position.

According to a presently preferred embodiment, said means for activating and deactivating the adjusting means comprises a cam member having a guide surface having an irregular portion. A switch member is provided having feeler means riding on said guide surface and sensing said irregular portion, said two members being arranged so that movement of said seat means over the operative range causes said feeler means to move over substantially the entire guide surface. The switch member opens to stop the motor of the adjusting means when the seat reaches a selected position.

Still referring to the presently preferred embodiment, said motor driven adjusting means comprises spindle means connected to at least a portion of said resilient means for moving the latter in relation to the pivot point about which said support means is pivoted on said base, whereby the magnitude of said moment is modified to equalize the downward forces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary side elevation view (with certain parts broken away) of a seat which embodies the present invention;

FIG. 2 is a schematic representation of the power driven adjusting means as well as the switch control means;

FIG. 3 is a side elevation view of another embodiment in accordance with the present invention; and FIG. 4 is a schematic representation of a power driven means and control means similar to that shown in FIG. 2 but for the seat in FIG. 3.

DESCRIPTION OF THE PREFERRED EMBODIMENTS

Referring now to the drawings, and particularly FIG. 1 thereof, it will be seen that the arrangement of the present invention comprises adjustable seat means 1 which has a substantially horizontal upper surface and serves to carry a cushion (not shown) as well as a customary back rest. Furthermore, it comprises a base 4, which is mounted on the floor, of an automotive motor vehicle, and is connected with the adjustable seat means 1 by means of two pair of parallel links 2 and 3. The parts 1, 2, 3 and 4 together form a parallelogram arrangement whereby the adjustable seat means or upper seat means 1 moves upwardly or downwardly (while its upper surface remains substantially horizontally) when the links 2 and 3 are caused to pivot, for example, during travel over rough terrain or bumpy road. The upper end portions of the links 2 are fulcrummed in the upper seat means 1, as at 5, and the lower end portions of these links are fulcrummed in the base 4, as at 5'. The fulcrum 5' is a transverse horizontal shaft which is rigid with the links 2 so that it turns about its axis in response to movement of the upper seat means 1 towards and away from the base 4. The fulcra for the upper and lower end portions of the links 3 are respectively shown at 5a and 5a'.

The shaft 5' is further rigidly connected with two downwardly extended projections or arms 6 which are located mainly in the interior of the base 4 and can be integral with the links 2 because these links are also fixed to the shaft 5'. It will be seen that the composite link including the two links 2 and the two extensions 6 constitute a bell crank lever having a first arm articulately connected with the upper portion 1 and a second arm confined in the interior of the base 1.

The median portions of the links 2 are articulately connected with the upper section 7a of a hydraulic or pneumatic shock absorber 7 which further includes a second or lower section 7b articulately connected with the base 4, as at 7c. The sections 7a, 7b are movable relative to each other in response to pivoting of the links 2 and serve to cushion the upper seat portion during travel on uneven terrain. In the illustrated embodiment, the upper section 7a of the shock absorber 7 has a coupling pin 2a which is removably received in one of the several pairs of registering holes or openings 2b provided in the link 2 substantially midway between the fulcra 5 and 5'. By moving the coupling pin 2a into another pair of openings 11, the user can change the distance between the shaft 5' and the point of connection of the upper section 7a to the links 2 to thereby change the moment or effort arm of the shock absorbers. If desired, the coupling pin 2a can be moved between an infinite number of positions by means of a suitable adjusting mechanism so that it can be placed at any desired distance from the shaft 5'. A suitable adjusting mechanism may include a screw which is rotatably mounted between the links 2 so as to extend in a longitudinal direction to these links, and a spindle nut which is provided in the upper end of section 7a and meshes with the screw so that it travels towards or away from the shaft 5' in response to rotation of the screw by means of a wheel or the like.

The extensions 6 of the link 2 are provided with elongated guide slots 8 which extend substantially or exactly radially of the shaft 5' and receive two followers in the form of pins or trunnions provided on a spindle nut 9 which is disposed between the extensions 6 and meshes with a rotating screw or a spindle 10. The spindle nut 9 is provided or connected with a short link 11 which is coupled to one end portion of at least one helical spring 13 by means of a pin 12. The other end portion of the spring 13 is connected with the base 4. As shown, the right-hand end portion of the spring 13, as viewed in FIG. 1, engages a horizontal pin 14 which is mounted in a bracket 15 of the base 4. The structure which is shown in the drawing preferably comprises two helical springs 13, one on each side of the screw 10. Thus, the pin 12 may extend beyond both sides of the link 11 and the left-hand end portions of the two springs 13 are then connected to such pin at the opposite sides of the link 11. The lower section 7b of the shock absorber 7 is preferably located between the two helical springs.

The screw or spindle 10 is rotatably mounted in transversely extending bridge member 6a which connect the two extensions 6 to each other. The screw 14 is free to rotate but can not move axially so that the spindle nut 9 is compelled to move lengthwise of the slots 8 when the screw 10 is caused to rotate by a mechanism including a set of bevel gears 16 and a shaft 17 which extends outwardly through an arcuate slot 18 provided in a sidewall 4a of the base 4. The outer end portion of the shaft 17 (which is rotatably journalled in at least one of the extensions 6) is connected to a motor 19 in order to rotate the feed screw 10 with attendant movement of the spindle nut 9 toward or away from the shaft 5'. It will be understood that the gears 16, the shaft 17 and the motor 19 participate in angular movement of the extension 6 about the axis of the shaft 5'.

The motor 19 can be selected to be of the DC or the AC type, although in accordance with the presently preferred embodiment for such seats in motor vehicles, the motor 19, as well as its associated circuitry, will be described as being of the DC variety. More particularly, the motor 19 is selected so that its direction of rotation can easily be reversed.

Referring to both FIG. 1 and 2, the embodiment under discussion further includes an on-off switch 20, which is connected in series with a source of DC power suitable for the driving of the motor 19. The on-off switch 20 can be conveniently located in the vehicle compartment, e.g., on the dash-board or on the side of the seat. Alternately, the on-off switch 20 can be of a pressure sensitive type which is arranged underneath the seat cushion so that it is activated upon an occupant being seated in the seat.

The subject embodiment shown in FIG. 1, includes further a switch member in the form of a stop switch 21 which is mounted on one of the downwardly projecting extensions 6 to automatically turn off the motor when a preselected optimum position of the adjustable seat means 1 has been achieved. To accomplish this automatic selection, a cam member 22, which is in the form of an elongated arcuate section having a substantially smooth cam surface which faces the switch member 21, is mounted rigidly to the sidewall 4a of the base 4. The cam member 22 is provided, in this cam surface, with an irregular portion or cut-out 23 which forms an inward recess in the cam surface. The cam member 22 is further provided with a pair of elongated positioning slots 24 which, in cooperation with a pair of set screws 25, permits the adjustment of the position of the cam member 22 along the path of travel of the bridge member 6a of the downwardly projecting extensions 6. In this manner, it is possible to position the cut-out 23 at a preselected position along a circumferential path about the transverse horizontal shaft 5'. The switch member 21 is normally closed to thereby connect the negative terminal of the source of power to the motor 19. However, when the feeler means 21a of the switch member 21 passes over the cut-out 23, the feeler means moves into the same to thereby open the switch member 21 and disconnect the supply of energy to motor 19. Thus, it is clear, that when the feeler means 21a is in contact with the cut-out 23, the motor 19 is necessarily deactivated.

Preferably, the elongated positioning slots 24 are sufficiently long to permit the positioning of cam member 22 over a wide range of positions so that when the adjustable seat means 1 moves over its operative range, e.g., from its uppermost possible position to its lowermost possible position, the bridge member 6a, as well as the feeler means 21a, move between the two ends of the cam member 22. In order to permit the selection of any of the positions of the operative range of the adjustable seat means 1 as the optimum or desired or preselected position, it is necessary that the cut out 23 be positioned so that the feeler means 21a and the cut-out 23 engage in the optimum position. However, it is not a critical feature of the present invention that cam member 22 be made movable to permit selection of any position of the seat means 1. In many instances a more restricted range may be acceptable since the desired preselected optimum position of the adjustable seat means 1 will be an intermediate or median position or another position which is within a small range of this median position.

As described above, the spindle nut 9, the short link 11 as well as the pin 12 are movable between the downward projecting extensions 6 towards and away from the transverse horizontal shaft 5' in response to the rotation of the spindle feed screw 10. The movement along the screw 10 is substantially between the two ends of the screw 10, i.e., between the region of the bevel gears 16 and the region of the bridge member 6a. In order to protect the motor 19 as well as to provide a convenient method of reversing the direction of the motor after the travel along the feed screw 10 has reached one end thereof, a pair of reversing switches 26 are provided which swing with the screw 10 about the shaft 5' and are mounted on the downwardly projected extensions 6, in the region of opposite ends of screw 10 as shown. The reversing switches have feeler means 26a which are positioned to come into contact with the unit 9 when the latter reaches the corresponding spindle and the corresponding switch 26 is activated to change the direction of rotation of the motor 19. Referring to FIG. 2, the switches 26 are of a double-pole, double throw variety. The common contacts of both poles of one of the switches 26 is connected to a terminal of the on-off switch 20. On the other hand, the common contacts of each of the poles of the other switch 26 is connected to another one of the inputs of the motor 19. The circuit arrangement for accomplishing the motor reversal is not critical to the present invention, as many other circuits may be utilized for that purpose. However, FIG. 2 shows the possible wiring arrangement between the switches 26 and motor 19. In the schematic, the feed screw 10 is shown to extend between the two feeler means 26a which extend beyond the short link 11, the latter being movable from one end of the rotatable feed screw to the other end to thereby engage one or the other of the means 26a. With the condition of the switches 26 as shown, and with the on-off switch 20 closed, and the feeler means 21a riding on the surface of the cam 22, a current will be delivered only to one of the input terminals of the motor. The current in this case will pass through the two right-hand poles of each of the reversing switches 26. Accordingly, the short link 11 will move in one of the directions along the screw 10. If the direction of rotation of motor 19 is such as to cause the feeler means 21a to move away from the cut-out 23, the short link 11 will ultimately reach one end of the screw 10 and contact with the corresponding feeler means 26a. The reversing switches are so arranged that the contacting of either one of the feeler means 26a causes the current to flow into another one of the input terminals of motor 19 to thereby reverse the direction of the motor. With the direction of rotation of the motor in reverse, the feeler means 21a now moves towards the cut-out 23, as it may have done originally if one of the reversing switches 26 had initially been in a different position. As explained above, as soon as the feeler means 21a extends into the cut-out 23 this opens the supply circuit to the motor 19 and further movement of the short link 11 ceases.

The aforementioned, but not illustrated adjusting means for moving the coupling pin 2a of the upper section of the shock absorber 7a between an infinite number of positions may include a feed screw similar to the feed screw 10 and a spindle nut which carries the coupling pin 2a and is analogous to the spindle nut 9. A hand wheel for rotating the feed screw of the adjusting means for the coupling pin 2a can be located at the exposed surface of the front wall 4b, or the screw may be motor driven by a motor similar to motor 19.

As suggested above, the embodiment shown in FIG. 1 permits an optimum position of the adjustable seat means 1 to be achieved automatically and without knowledge of the occupant's weight. By adjusting the position of the cam member 22 relative to the position of the stop switch or switch member 21, the short link 11 moves in an upward or downward direction along the screw 10 so as to change the moment arm about which the helical spring 13 acts about the transverse shaft 5'.

The operation of the embodiment as shown in FIG. 1 and 2 will now be described. With the cam member 22 adjusted to provide an intermediate optimum position of the adjustable seat means 1, the occupant sits thereon and the on-off switch 20 is either manually or automatically closed. The weight of the occupant causes the adjustable seat means 1 to move in a downward direction, and, therefore, causes the downwardly projecting extensions 6 as well as switch 21 to move in a clockwise direction about the transverse horizontal shaft 5'. With the spindle nut 9 in an initial position along the screw 10, the spring 13 will be tensioned so as to provide a moment about the transverse shaft 5' to counteract the downward force applied to the adjustable seat means 1. An equalibrium or steady state point will be reached when the downward force applied by the weight of the occupant is fully counteracted by the moment of the helical spring in a counterclockwise direction about the transverse shaft 5'. If the weight of the occupant is such that the feeler means 21a will be in the cut-out 23, the motor 19 will not be activated since an equalibrium condition exists. On the other hand, if the weight of the occupant is greater or less than the weight which would cause such meeting of the feeler means 21a and the cut-out 23 for an initial position of the short links 11, the feeler means 21a will be located along the guide surface of the cam member 22 either before or beyond the cut-out 23 respectively. In this case, the switch member 21 remains closed and the motor 19 rotates in one direction or another depending on the initial settings of the reversing switches 26. As described above, should motor 19 begin to rotate in a direction to cause the feeler means 21a to move directly towards the cut-out 23, then the adjustable seat means will move initially towards the optimum position and stop in that position when the feeler means 21a engages the cut-out 23. On the other hand, should the direction of rotation of the motor 19 be such that the feeler means 21a moves away from the cut-out 23 and towards one of the end positions of the feed screw 10, then the adjustable seat means 1 will initially move away from the optimum position until the direction of the motor 19 is reversed in response to the short link 11 coming into contact with one of the feeler means 26a at the end of the screw travel. At such time, the feeler means 21a will again move toward the direction of the cut-out 23 and the motor 19 will stop when engagement is entertained as described above. It is clear from the above description that the counteracting moment which is provided by the helical spring 13, as well as that provided by the shock absorber 7, can be easily adjusted by changing the length of the moment arms about the transverse shaft 5' along one of the arms of the bell crank which is formed by the downwardly projecting extensions 6 and the links 2.

Referring now to FIG. 3, there is shown another embodiment of the present invention wherein the adjustable seat means 1 is again mounted for movement on the base 4 by means of a pair of coupling links 2 and 3. In this embodiment, links 2 are connected to the adjustable seat means 1 about a coupling pin 27. A U-shaped bracket 28 is fixedly mounted within the base 4. Elements in the embodiment shown in FIG. 3 which are the same as those shown in FIG. 1 are given the same reference numerals, while those which serve the same function are designated by the primed equivalents of the reference numerals utilized in FIG. 1. Thus, the bracket 28 is provided with a pair of guide slots 8' which are directed in a substantially circumferential direction of the coupling pin 27. In the present embodiment, the spindle nut 9' is connected to the screw 10' and to a short link 11. The short link 11 is connected to a pin 12' which extends through the slot 8' of bracket 28.

The shock absorber 7 as well as the helical springs 13' are connected between the pin 12' and the pin 27. The helical springs 13 and the shock absorber 7 can be mounted coaxially or adjacent and parallel to one another between the pins 12' and 27.

The screw 10', as in the previous embodiment, is motor driven by a motor 19' which is connected to the screw 10' by means of a coupling 29, e.g., a universal joint. It will be noted that the screw 10' is substantially parallel to the guide slots 8' so that the distance between the pin 12' and the spindle nut 9' is always the same and the short link 11 thereby always moves in a direction parallel to the guide slot 8' but it always remains perpendicular to direction of travel.

In the present embodiment, the helical springs 13' as well as shock absorber 7 acts between the coupling pins 27 and 12'. At the lower ends of these respective resilient members, the helical spring 13' and shock absorber 7 act against the lower edges of the guide slots 8', the force exerted against the bracket 28 being in a direction substantially perpendicular to the direction of the slots 8'. At the other ends of the resilient means, the helical spring 13' and shock absorber 7 act against the pin 27, the direction of the forces exerted against the pin 27 being variable by the movement of the pin 12' along the guide slots 8'. The counterclockwise moment about the transverse shaft 5, which opposes the downward forces applied to the adjustable seat means 1, can be modified in the present embodiment by changing the direction of the force applied to the pin 27. The moment arm for the counteracting moment is equal to the length of the link 2, namely, the distance between the shaft 5 and the coupling pin 27. Thus, the moment arm for the seat means remains the same, and only the effective force component normal to the link 2 is changed by changing the direction of the forces applied to pin 27.

As in the embodiment shown in FIG. 1, cam member 22 has a cut-out 23 and elongated positioning slots are provided for the purpose described above. Switch 21 is rigidly mounted on the sidewall 4a of the base 4 and the cam member 22 is mounted for movement with the link 3 so that the cam member 22 has its guide surface scanned as the adjustable seat means 1 moves between extreme positions. It will thus be noted that it is not critical for purposes of this invention whether cam member 22 or switch member 21 is rigidly fixed or, respectively, movably mounted, it only being important that one of said members be mounted for movement and one is rigidly fixed so that one may move relative to the other with movement of the adjustable seat means 1 so that the feeler means 21a may ride over almost the entire guide surface of cam 22.

As in the embodiment described in FIG. 1, a pair of switches 30 are positioned at each end of the guide slots 8' to sense when the elements movable along the feed screw 10' have reached one of the ends of the guide slots 8'. Referring both to FIGS. 3 and 4, it will be noted that in accordance with this second embodiment, the switches 30 are of the normally closed type. An additional set of actuating switches 20' and 20'' are mounted on the front wall 4b of the base 4 in a convenient location to the occupant of the seat, or the latter switches can also be mounted on the dashboard of the vehicle. The actuating switches 20' and 20'' can be selected to be single-pole, single-throw switches or, preferably, they are selected to be momentary contact switches. Each actuating switch 20' or 20'' is associated with one direction of rotation of the motor 19'. Thus, when the switch member 21 is closed, and, for example, actuating switch 20' is depressed, a current will flow through the right-hand switch 30, as shown in FIG. 4, to one terminal of the motor 19'. On the other hand, if the actuating switch 20'' is closed, then the current will flow through the right-hand switch 30 to another terminal of the motor 19'. With this arrangement, an appropriate direction of the rotation of motor 19' may be selected so that the feeler means 21a immediately moves towards the cut-out 23. In this manner, the optimum position of the adjustable seat means 1 is directly and more quickly achieved than with the embodiment shown in FIG. 1 where, in certain initial settings of the reversing switches 26, it is possible that the feeler means 21a initially moves away from the cut-out 23.

Referring to FIG. 4, it will be noted that when the short link 11 arrives at one of the end positions of the feed screw 19', it will act upon a corresponding feeler means 30a which will have the effect of opening the respective normally closed switch 30. The actuating switches 20', 20'' and the normally closed switches 30 are so arranged so that the short link 11 moves towards the normally closed switch 30 which is in circuit with the actuated switch 20' or 20''. In this manner, the motor 19' is protected when one of the actuating switches 20', 20'' is maintained in a depressed position since the short link 11 automatically opens up the circuit of the actuated switch 20' or 20'' to thereby prevent further energization of the motor 19'.

With the embodiment as shown in FIG. 3, it is possible to select a position other than the pre-adjusted or preselected optimum position should the occupant so desire it. One of the switches 20' or 20'' is depressed until the desired position of the adjustable seat means 1 is attained and then the actuating switch is released.

To distinguish the actuating switches 20', 20'', these two switches can be provided with knobs of different shapes and/or colors. Preferably, the shapes of the two actuating switches are substantially different that they may be recognized by merely touching the same without the necessity of looking at the switches. This is accomplished in the embodiment as shown in FIG. 3 by providing a large knob associated with the switch 20'' and a relatively small knob associated with the actuating switch 20'.

It will be understood that each of the elements described above, or two or more together, may also find a useful application in other types of seats differing from the types described above.

While the invention has been illustrated and described as embodied in automatically adjustable seats, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. In a seat, particularly for use in an automotive vehicle, a combination comprising a base; seat means spaced from said base; support means pivotally connected to said base and said seat means and supporting the latter in a substantially horizontal position and movable toward and away from said base; resilient means acting between said base and at least one of said preceding means for storing energy in response to a downward force applied to said seat means and for applying a moment to said seat means counteracting said downward force; motor driven adjusting means connected to said resilient means for adjusting the moment applied by said resilient means to said seat means to maintain the latter substantially at a predetermined distance from said base regardless of the magnitude of said downwardly directed force; and means for activating said adjusting means when said seat means moves under the influence of said force away from said predetermined position and for deactivating said adjusting means when said seat means is in said predetermined position.

2. A combination as defined in claim 1, wherein said means for activating and deactivating said adjusting means comprises a cam member having a guide surface having an irregular portion; and a switch member having feeler means for riding on said guide surface and sensing said irregular portion, said two members being arranged so that movement of said seat means over the operative range causes said feeler means to ride over substantially the entire guide surface.

3. A combination as defined in claim 2, further including circuit means connected to said switch member and to said motor drive adjusting means, said switch member opening said circuit means in response to said feeler means contacting said irregular portion, to thereby deactivate said adjusting means.

4. A combination as defined in claim 3, wherein said motor driven adjusting means comprises spindle means connected to at least a portion of said resilient means for moving the latter in relation to a pivot point about which said support means pivots about said base; and motor means coupled to said spindle means for causing the latter to move said resilient means portion, whereby the magnitude of said moment is modified to equalize said downward force.

5. A combination as defined in claim 2, wherein one of said members is fixedly mounted on said base while the other member is mounted on one of said prior mentioned preceding means for sharing the movements thereof.

6. A combination as defined in claim 4, and including a electromotor driving said spindle means, said spindle means being arranged to move said resilient means portion between first and second positions which respectively correspond to the end positions of the operative range of positions of said seat means above said base, and further comprising a pair of reversing switches respectively positioned at said first and second positions for sensing when said portion has reached the corresponding position, said reversing switches being connected to said circuit means and each arranged to change the direction of current flow through said electric motor, whereby said motor means is reversed in its direction of rotation when one of said positions has been reached.

7. A combination as defined in claim 6, further comprising an on-off switch connected in said circuit means.

8. A combination as defined in claim 4, and including an electromotor driving said spindle means, said spindle means being arranged to move said resilient means between first and second positions which respectively correspond to the end positions of the range of positions of the operative range of said seat means above said base, and further comprising a pair of normally closed switches, said switches opening in response to said portion reaching one of said positions; and a pair of actuating switches each connected to another of said normally closed switches, said circuit means being arranged between said four switches so that the closing of each of the actuating switches causes said electromotor to urge said portion, through said spindle means, to move respectively in the direction of the closed actuated switch.

9. A combination as defined in claim 2, wherein said cam member has a substantially smooth surface, and wherein said irregular portion comprises a cut-out portion, said feeler means comprising a roller which rolls on said smooth surface and enters said cut-out portion when said seat means is positioned at a predetermined spacing above said base to thereby open said switch member and prevent the energization of said motor driven adjusting means.

10. A combination as defined in claim 2, wherein at least one of said members include adjustable positioning means for moving said at least one member relative to the other to thereby preselect an optimum spacing of said seat means above said base at which point said feeler means contacts said irregular portion.

11. A combination as defined in claim 1, wherein said support means comprises at least one bell-crank, and said resilient means comprises a biassing spring connected to said base and adjustably connected to one arm of said bell-crank, and a shock absorber connected to said base and adjustably connected to the other arm of said bell-crank.

12. A combination as defined in claim 11, wherein said motor driven adjusting means comprises a motor driven spindle rotatably mounted on said one arm, and coupling means connecting said spindle with said biassing means for longitudinal movement along said spindle in response to rotation of said spindle.

13. A combination as defined in claim 1, wherein said resilient means comprises a biassing spring, and a shock absorber mounted coaxially with the latter, these elements being connected at one of their ends to the pivot point about which said seat means pivots about said support means.

14. A combination as defined in claim 13, further comprising at least one bracket having a guide slot extending substantially perpendicularly to the direction of the axis of said pivot point; said motor driven adjusting means comprises a spindle rotatably mounted and extending along said guide slot; and coupling means for connecting said spindle to said biassing spring and cooperatively engaged in said slot to thereby guide said coupling means in response to rotation of said spindle, said biassing spring acting between said pivot point and said coupling means to generate a force passing through said pivot point in a predetermined direction, said portion being movable from one end of the guide slot to the other end thereof in response to rotation of said spindle, whereby the direction of the force of said spring is changed to thereby modify said counteracting moment.

* * * * *